United States Patent [19]

Li et al.

[11] Patent Number: 4,490,511

[45] Date of Patent: Dec. 25, 1984

[54] PROCESS FOR PREPARATION OF LOW-DUSTING EPOXY CURING AGENTS BASED ON TRIMELLITIC ANHYDRIDE

[75] Inventors: Simon M. Li, Houston; Fred R. Lemley, Baytown, both of Tex.

[73] Assignee: Shell Oil Company, Houston, Tex.

[21] Appl. No.: 584,429

[22] Filed: Feb. 28, 1984

[51] Int. Cl.$^3$ ............................................. C08G 59/42
[52] U.S. Cl. .................................... 525/507; 528/115; 528/365; 252/182
[58] Field of Search ................ 528/115, 365; 252/182; 525/507

[56] References Cited

U.S. PATENT DOCUMENTS 2,965,610 12/1960 Newey .................................. 528/115
3,388,185 6/1968 Goldberg et al. .............. 528/115 X Primary Examiner—Earl A. Nielsen
Attorney, Agent, or Firm—Norris E. Faringer

[57] ABSTRACT

The invention provides a low-dusting anhydride curing agent blend for epoxy resins comprising a solid acid anhydride (trimellitic anhydride) and a normally liquid acid anhydride (methyl hexahydrophthalic anhydride. The invention further provides processes for preparing the anhydride blends and to curable epoxy compositions thereof.

16 Claims, No Drawings

PROCESS FOR PREPARATION OF LOW-DUSTING EPOXY CURING AGENTS BASED ON TRIMELLITIC ANHYDRIDE

FIELD OF THE INVENTION

The present invention is directed to low-dusting acid anhydride curing agents for epoxy resins and to their methods of preparation.

BACKGROUND OF THE INVENTION

Acid anhydrides are commonly used as curing agents for epoxy resins. Whereas many liquid anhydrides are easily mixed with liquid epoxy resins and are thereby cured in thermoset applications, certain solid anhydrides, such as, for example, trimellitic anhydride (TMA) are more difficult to use as curing agents. Because TMA has a low solubility in most liquid epoxy resins and has a relatively high (165° C.) melting point, its efficiency as a curing agent is dependent on its uniform distribution in the liquid resin formulation, generally followed by heating to effect dissolution and subsequent reaction. Finely divided TMA is especially useful in heat-curable compositions disclosed and claimed in U.S. Pat. No. 4,284,753, and known methods for obtaining a preferred particle size include ball milling and jet milling. The resulting finely divided material is however very difficult to handle because of the extreme dusting tendencies combined with the toxic effects of inhalation.

It was demonstrated that the dusting tendency can be greatly reduced if the preground TMA is post-wetted with up to about 10% by weight of liquid methyl hexahydrophthalic anhydride (MHHPA). The resulting curing agent still maintains good but slightly lower high temperature performance properties in a cured resin system like the composition disclosed in U.S. Pat. No. 4,284,753. In fact, when laboratory prepared samples were subjected to a quantitative dusting test as hereinafter more clearly described, the dusting level of the post-wetted sample was diminished by a factor of 100 compared with the non-wetted material. When this post-wetting technique was sealed up using various types of equipment such as Littleford mixer, Schugi agglomerator and ribbon blender, it was found that it was possible to produce a low dust level product at <10% by weight loading of MHHPA on TMA while achieving improved high temperature cured resin properties. In some instances, however, there were occasional soft agglomerates indicating uneven wetting in the products prepared by this post-wetting route. If insufficient blending is achieved, the resulting agglomerates have, in some cases, resulted in curing agent settling during the resin system formulation operation resulting in an undesirable cured product.

It has now been further found that if the raw or neat TMA is first prewet, usually in flake form, with liquid MHHPA, and then this premixture is processed through a size reducing means such as a jet mill, the resulting epoxy curing agent is a non-agglomerated product exhibiting exceptionally low dusting properties.

Thus, a low dusting acid anhydride epoxy curing agent is prepared by (a) post-wetting a finely divided TMA powder with liquid MHHPA or (b) pre-wetting the TMA flakes with liquid MHHPA prior to reducing the particle size of the premixture. The most preferred process is the (b) process, i.e., the pre-wetting process.

SUMMARY OF THE INVENTION

The present invention is directed to a low-dusting finely-divided anhydride curing agent composition for epoxy resin compositions which comprises from about 1% to about 10% by weight of a normally liquid anhydride such as methyl hexahydrophthalic anhydride and from about 90 to 99% by weight of solid anhydride or a solid anhydride containing a quarternary ammonium salt at about 98:2 weight ratio.

This composition may be prepared by (a) pre-wetting the solid anhydride such as flaked TMA with/without the quarternary salt by the liquid anhydride prior to reducing the particle size to the desired range or (b) post-wetting the preground solid anhydride such as TMA with/without the quarternary ammonium salt by the liquid anhydride. The most preferred method comprises the pre-wetting technique.

DESCRIPTION OF THE PREFERRED EMBODIMENTS

It has now been found that a low-dusting acid anhydride composition especially suitable for use as a curing agent for epoxy resin compositions comprises from about 1% to about 10% by weight of a liquid anhydride and from about 90% to about 99% by weight of a solid acid anhydride or a solid anhydride containing a quarternary ammonium salt at about 98:2 weight ratio. Preferred solid acid anhydrides include trimellitic anhydride, chlorendic anhydride and 3,3',4,4'-benzophenone tetracarboxylic anhydride. Especially preferred is trimellitic anhydride, and the disclosure herein will be described with reference to the use of trimellitic anhydride (TMA). The quarternary ammonium salt can be tetrabutylammonium bromide (TBAB), tetramethylammonium chloride (TMAC) and the like. Especially preferred ammonium salt is TBAB. Preferred liquid acid anhydrides include among others methyl hexahydrophthalic anhydride (MHHPA), nadic methyl anhydride (NMA), and dodecyl succinic anhydride (DDSA). Especially preferred is MHHPA.

It has further been found that this low dusting anhydride curing agent can be prepared by either the above-noted post-wetting technique or the pre-wetting technique.

The present acid anhydride curing agents can be conveniently prepared using conventional mixing, grinding, and particle size reduction equipment. For example, when the post-wetting technique is employed, various types of equipment were found useful such as the Littleford mixer, Schugi agglomerator and ribbon blender.

In the pre-wetting technique the raw solid anhydride, usually in flake form, is mixed with liquid acid anhydride such as MHHPA. This premixture is then processed through a jet or hammer mill to produce a low dusting, non-agglomerated epoxy curing agent.

The curing agent blend will generally comprise from about 90 to 99 parts by weight of solid anhydride or solid anhydride containing a quarternary ammonium salt at about 98:2 weight ratio and from about 1 to 10 parts by weight MHHPA. Very preferred ranges are 95 to 98 parts of the solid to about 2 to 5 parts by weight of MHHPA.

The present novel solid anhydride curing agent is useful for curing epoxy resin compositions. As noted hereinbefore, these curing agents are useful in epoxy compositions and epoxy-styrene compositions disclosed in U.S. Pat. No. 4,284,753. Suitable epoxy resins are disclosed in U.S. Pat. No. 4,284,753, and such disclosure is incorporated herein by reference.

Other suitable polyepoxides are disclosed in U.S. Pat. No. 3,356,624, 3,408,219, 3,446,762, and 3,637,618 and the disclosure of these patents relevant to examples of epoxy compounds is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000 and more preferably an average molecular weight of from about 300 to about 1000 and an epoxide equivalent weight of from about 140 to about 650.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or by the reaction of hydrogenated polyhydric phenols with epichlorohydrin in the presence of a suitable catalyst such as a Lewis acid, e.g., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the hydrogenated phenol is hydrogenated Bisphenol A, the resulting saturated epoxy compound is sometimes referred to as "diepoxidized hydrogenated Bisphenol A", or more propertly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic rings of the phenols have been or are saturated.

Preferred saturated epoxy resins are the hydrogenated resins prepared by the process described in U.S. Pat. No. 3,336,241. Especially preferred are the hydrogenated glycidyl ethers of 2,2-bis(4-hydroxyphenyl)propane, sometimes called the diglycidyl ethers of 2,2-bis(4-cyclohexanol)propane.

Other examples of suitable polyepoxides include the glycidyl ethers of novolac resins, i.e., phenol-aldehyde condensates. Preferred resins of this type are those disclosed in U.S. Pat. No. 2,658,885.

In general, a curing amount of the anhydride blend is used. Preferably, from about 0.5 to about 1.5 chemical equivalents of the anhydride curing agent blend is used per chemical equivalent of epoxy resin, with from about 0.75 to about 1.25, being preferred.

The following examples are given to illustrate the preparation of the present acid anhydride curing agent blends, to their use in curing epoxy resin compositions. It is understood that the examples are embodiments only and are given for the purpose of illustration only and the invention is not to be regarded as limited to any specific components and/or specific conditions recited therein. Unless otherwise indicated, parts and percentages in the examples, are parts and percentages by weight.

EPON®Resin 828 is a glycidyl polyether of 2,2-bis(4-hydroxyphenyl)propane having an average molecular weight of 380 and a weight per epoxy of about 180–195.

Dusting Characterization

This test quantities the dusting tendency of TMA or wetted TMA solid particulates.

Method Summary

The amount of "dust" in the TMA dust or the TMA liquid anhydride blend is quantified by:
1. First fluidizing the given solid in a fluidization chamber.
2. Collecting the overhead "dust" in an aqueous medium.
3. Titrating the aqueous solution with a base.

The amount of TMA dust collected in the solution is determined from the difference of the sample titration and a blank titration.

Equipment

1. $N_2$ source
2. Wet test meter (or equivalent) for monitoring the nitrogen flow rate; stopwatch
3. Desiccator
4. Fluidized bed (3½" fritted disc-width; 6" Chamber length)
5. Magnetic stirrer and teflon-coated magnetic bar
6. Collector with stopper
7. A three-way valve, stainless steel tubing, and miscellaneous glass tubing Reagents 1. Distilled water
2. 0.1N potassium hydroxide solution or sodium hydroxide solution
3. Phenolphthalein indicator, 1 gram in 100 ml of 3A alcohol Procedure 1. Put a telfon-coated magnetic bar into the fluidized bed, then carefully transfer 10 g±0.2 g of solid into the same with the aid of a paper funnel. Place the top onto the fluidized bed.
2. Charge ~50–100 cc water into the 250 ml graduated cylinder collector and put the stopper onto the collector.
3. Adjust the nitrogen flow rate to 0.5 scfm using the stopwatch and the wet test meter; vent $N_2$ through position 1.

4. After the N₂ flow rate is adjusted, turn on the magnetic stirrer and gently mix the solid powder; quickly set the 3-way valve to position 2 and start the timer. The "dust" is blown over the fluidized bed top into the collector. Some may accumulate in the transfer glass tubings. Adjust the magnetic bar stirring rate to ~30–60 rpm.
5. After a prescribed time is reached, set the 3-way valve to position 1 and vent N₂. Stop magnetic stirring; carefully open the top and use 25–50 cc water to rinse all powder accumulated in the transfer glass tubings into the collector. Warm the aqueous solution inside the collector, if necessary, to dissolve the dust.
6. Add 4 drops of phenolphthalein indicator and titrate all of the aqueous solution with 0.1N KOH to the phenolphthalein end point.
7. Titrate a blank (50 ml of distilled water).
8. Calculation:

$$x = 0.192 \frac{(A-B)N}{3} \frac{1}{T}$$

where
x = Gm of TMA Collected/Min.
A = Ml KOH Sample
B = Ml KOH Blank
N = Normality of KOH
T = Duration of Dust Collection, 1 to 3 Minutes
Note: It has been assumed all dust collected is TMA (no liquid anhydride).

EXAMPLE 1

Various amounts of trimellitic anhydride and several liquid anhydrides were combined via the post-wetting and prewetting techniques. The dust levels were then determined as described hereinbefore. The results are tabulated in Table 1.

TABLE 1
MANUFACTURE OF LOW-DUSTING TMA CURING AGENTS

| Technique | Solid Identification | % w Liquid Used | Dusting Level g TMA/Min N₂ Flow | Average Particle Volume Diameter, microns | Remarks |
|---|---|---|---|---|---|
| A. Non-wetted | Flake TMA | 0.0 | 0.190 | 6.8 | Non-wetted flake TMP processed through a Pulvajet mill. |
| B. Post-wetted | Jet-milled TMA | 10.0¹ | 0.0020 | — | Laboratory-prepared sample. |
| | Hammer-milled TMA | 3.0¹ | 0.0012 | — | Liffleford mixer post-wetting of ground TMA with liquid. |
| | | 3.0¹ | 0.0028, 0.0020 | — | |
| | | 3.0¹ | 0.0011 | — | |
| | | 6.5¹ | 0.0010 | — | |
| | Hammer-milled TMA | 3.5¹ | 0.0019 | — | Schugi agglomerator post-wetting of ground TMA with liquid. |
| | | 5.1¹ | 0.0012 | — | |
| | | 8.2¹ | 0.0005 | — | |
| | | 5.0¹ | 0.0018 | — | |
| | | 5.0¹ | 0.0008 | — | |
| | Jet-milled TMA | 5.0 max¹ | 0.018 | — | Ribbon blender post-wetting of ground TMA with liquid. |
| | | 7.1 max¹ | 0.001 | — | |
| | | 9.2 max¹ | 0.0025 | — | |
| | | 9.6 max¹ | 0.0009 | — | |
| C. Pre-wetted | Jet-milled TMA | 8.0 max¹ | 0.0008 | — | 1. Ribbon-blender mixed ground TMA/liquid. 2. Mixture processed through Pulvajet mill. |
| | Flake TMA | 3.0¹ | 0.0013 | 21.9 | 1. Ribbon-blender mixed flake TMA/liquid. |
| | | 3.0¹ | 0.0017 | — | |
| | | 3.0¹ | 0.0019 | — | 2. Mixture processed through Pulvajet mill. |
| | Flake TMA | 3.0¹ | 0.0029 | 8.5 | Laboratory-prepared samples: |
| | | 3.0² | 0.0079 | 9.2 | |
| | | 3.0³ | 0.0031 | 7.6 | 1. Jiffy mixer blended flake TMA/liquid. 2. Mixture processes through laboratory jet mill. |
| | Flake TMA and crystalline tetrabutyl ammonium bromide (at 98:2 ratio, wt) | 2.9¹ | 0.094 | 16.8 | Laboratory-prepared samples: 1. Jiffy mixer blended flake TMA/liquid. 2. Mixture processed through laboratory jet mill at a very slow rate. |

¹Liquid used is methyl hexahydrophthalic anhydride; based on total weight of mixture.
²Liquid used is dodecane succinic anhydride (DDSA); based on total weight of mixture.
³Liquid used is nadic methyl anhydride (NMA); based on total weight of mixture.

EXAMPLE 2

These examples illustrate the use of the acid anhydride blends as curing agents for epoxy resin compositions.

(a) 4.15 parts of a jet-milled 97:3 trimellitic anhydride:-methyl hexahydrophthalic anhydride curing agent blend (obtained by the prewetting technique) and 100 parts of a resin solution consisting of 19.8% wt styrene (containing 400 ppm benzoquinone), 79.1% wt EPON ®Resin 828, 0.79% wt tetrabutyl ammonium bromide and 0.32% wt Lupersol 101 were well mixed and de-aerated. The resulting mixture was then transferred into a mold and cured at 300° C. for 2 hours.

(b) 41.5 parts of a jet-milled 97:3 trimellitic anhydride-tetrabutyl ammonium bromide (at 98:2 weight ratio):- methyl hexahydrophthalic anhydride curing agent blend (obtained by the pre-wetting technique) and 100 parts of a resin solution consisting of 19.9% wt styrene (containing 400 ppm benzoquinone), 79.7% wt EPON ®Resin 828, 0.32% wt Lupersol 101, were well mixed and de-aerated. The resulting mixture was then transferred into a mold and cured at 300° C. for 2 hours.

(c) 40 parts of a jet-milled trimellitic anhydride as curing agent and 100 parts of a resin solution consisting of 19.8% wt styrene (containing 400 ppm benzoquinone), 79.1% wt EPON Resin 828, 0.79% wt tetrabutyl ammonium bromide and 0.32% wt Lupersol 101 were well mixed and de-aerated. The resulting mixture was then transferred into a mold and cured at 300° C. for 2 hours.

The results are summarized in Table 2.

TABLE 2

SUMMARY OF RESULTS OF CURED CAST PROPERTIES

| System | Tg, °C. | Heat Distortion Temperature, °C. | Room Temperature Flexible Mod., psi | Room Temperature Flexible Strength, psi |
|---|---|---|---|---|
| (a) | 200 | 170 | $4.68 \times 10^5$ | $18.9 \times 10^3$ |
| (b) | 190 | 159 | $4.40 \times 10^5$ | $19.1 \times 10^3$ |
| (c) | 191 | 167 | $4.68 \times 10^5$ | $16.7 \times 10^3$ |

What is claimed is:

1. A low-dusting anhydride blend especially useful for curing epoxy resin compositions comprising (1) from about 1% to about 10% by weight of a normally liquid anhydride and (2) from about 90% to about 99% of a solid acid anhydride.

2. The composition of claim 1 wherein the solid acid anhydride is trimellitic anhydride.

3. The composition of claim 1 wherein the liquid anhydride is methyl hexahydrophthalic anhydride.

4. The composition of claim 1 wherein the liquid anhydride is nadic methyl anhydride.

5. The composition of claim 1 wherein the liquid anhydride is dodecyl succinic anhydride.

6. The composition of claim 1 wherein the solid acid anhydride contains a quarternary ammonium salt in the weight ratio of from about 95:5 to about 98:2.

7. A process for preparing a low dusting anhydride blend useful for curing epoxy resin composition which comprises (1) mixing and blending from about 1% to about 10% by weight of a normally liquid anhydride with from about 90% to about 99% by weight of a solid acid anhydride and (2) reducing the particle size of the blend to an average volume particle size of about 5-25 microns.

8. The process of claim 7 wherein the acid anhydride is in flake form.

9. The process of claim 7 wherein the acid anhydride is trimellitic anhydride.

10. The process of claim 7 wherein the liquid anhydride is methyl hexahydrophthalic anhydride.

11. The process of claim 10 wherein the weight ratio of methyl hexahydrophthalic anhydride to trimellitic anhydride is from about 2:98 to about 5:95.

12. A process for preparing a low dusting anhydride blend useful for curing epoxy resin compositions which comprises (1) reducing the medium particle size of a solid acid anhydride to less than about 20 microns and (2) mixing said anhydride with methyl hexahydrophthalic anhydride, the weight ratio of solid anhydride to methyl hexahydrophthalic anhydride being from about 99:1 to 90:10.

13. The process of claim 12 wherein the solid acid anhydride is trimellitic anhydride.

14. A curable composition comprising an epoxy resin and a curing amount of the composition of claim 1.

15. A curable composition comprising an epoxy resin and a curing amount of the composition of claim 2.

16. A curable composition comprising an epoxy resin and a curing amount of the composition of claim 3.

* * * * *